Nov. 7, 1967   T. I. TAYLOR   3,351,562
PROCESS FOR PRODUCING A SYNTHETIC BREATHABLE ATMOSPHERE
Filed June 18, 1965
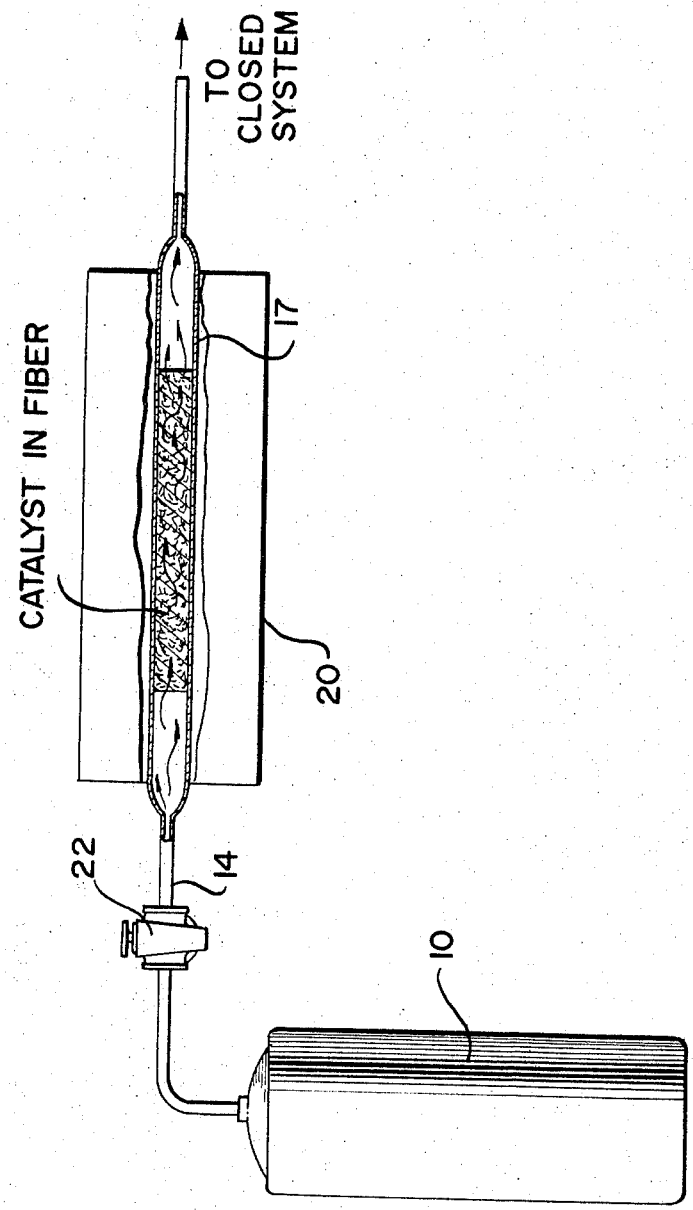
INVENTOR
THOMAS I. TAYLOR
BY Hurwitz & Rose
ATTORNEYS

United States Patent Office 3,351,562
Patented Nov. 7, 1967

3,351,562
PROCESS FOR PRODUCING A SYNTHETIC BREATHABLE ATMOSPHERE
Thomas I. Taylor, Leonia, N.J., assignor to Isomet Corporation, Palisades Park, N.J., a corporation of New Jersey
Filed June 18, 1965, Ser. No. 465,011
4 Claims. (Cl. 252—372)

The present invention relates generally to synthesis of breathable atmosphere and more particularly to methods for synthesizing a breathable atmosphere sufficient to sustain respirator functions of animal life in closed ecological systems.

The problem of providing a suitable atmosphere to sustain animal life in closed ecological systems, such as submarines, manned space vehicles, bomb shelters and other enclosed areas in which man must survive without access to the earth's atmosphere for prolonged periods of time, has become more acute in recent years due to increases in development of long-occupancy closed systems. In the field of space exploration, for example, research is presently underway to investigate the possibility of developing suitable space craft for supporting manned space flight missions of extended duration. In such a program, the provision of an environment within the craft capable of supporting animal respiration during the entire period of the voyage presents a significant problem. Experiments have shown that man can tolerate inhalation of pure oxygen for limited periods of time, but evidence has been presented to substantiate the theory that an atmosphere of pure oxygen is incapable of providing an environment in which man can survive for the prolonged periods necessary for the accomplishment of such missions.

It is, accordingly, a principal object of the present invention to provide methods for producing a closed ecological system atmosphere which is substantially similar in composition to that of the earth's atmosphere.

The atmosphere to which man is accustomed, that is the earth's atmosphere, consists of approximately 21 percent oxygen (159 mm. Hg pressure), 78 percent nitrogen (596 mm. Hg. pressure), 0.94 percent argon, 0.04 carbon dioxide, along with water vapor and traces of other gases at a total pressure of about 760 mm. Hg. Oxygen patrial pressures should be maintained between a maximum of 425 mm. Hg. pressure and a minimum of 100 mm. Hg. pressure to avoid oxygen toxicity and hyoxia. The recommended partial pressure of oxygen in a four gas atmosphere of nitrogen, oxygen, carbon dioxide and water vapor, is from 150 to 200 mm. Hg. pressure. It is apparent from these considerations that if the total pressure is decreased from one atmosphere (14.7 p.s.i.), the percentage of oxygen must be increased. At 0.69 atmosphere, corresponding to an altitude of 10,000 feet, the percentage of oxygen required for an oxygen pressure of 160 mm. Hg. would be approximately 31 percent: at 15,000 feet (0.56 atmosphere), 36 percent oxygen; and at 70,000 feet (0.46 atmosphere), 46 percent oxygen. The recommended pressure for a three gas atmosphere (oxygen, carbon dioxide and water vapor) is 5 p.s.i. or about 250 mm. Hg. oxygen pressure.

The choice of a suitable atmosphere between the three gas system and the four gas system will depend upon a variety of considerations, some of which will herein after be discussed. It is an object of the present invention to provide methods and apparatus for production of oxygen and nitrogen in proportions appropriate to a four gas system.

In accordance with the present invention nitrous oxide is decomposed in the presence of a catalyst, at temperatures within a fixed range, to provide nitrogen and oxygen gases in suitable amounts for a four gas atmosphere, thus, dispensing with the necessity of complex control systems for adjusting gaseous flow from individual supplies of oxygen and nitrogen.

It is therefore, a further object of the present invention to provide methods for decomposing nitrous oxide in the presence of a catalyst to provide proportions of nitrogen and oxygen appropriate to a life sustaining atmosphere.

These and other objects, features and attendant advantages of the present invention will become apparent from a consideration of the following discussion and description of specific embodiments thereof, especially when taken in conjunction with the accompanying drawing, in which the sole figure is a diagram of an exemplary system for providing a breathable atmosphere.

Various factors must be taken into account in the determination of the type of atmosphere which is most advantageous for use in a closed ecological system. Some of these considerations, pertaining to relative choice of a three gas versus a four gas system follow.

Regarding structural requirements of the closed system and gas pressures to be used therein, at altitudes below the radiation belt (approximately 400 miles) it is unnecessary to shield a manned space vehicle, and therefore a lighter weight and a lower loss of gases results if a reduced pressure is used inside the cabin. In this respect pure oxygen at 5 p.s.i. (250 mm. Hg. pressure) has a significant advantage over mixtures of oxygen and nitrogen at 14.7 p.s.i. The total pressure of a four gas system could, however, be reduced to 0.56 atmosphere (8.2 p.s.i., 15,000 feet) or perhaps to 0.46 atmosphere (6.8 p.s.i., 20,000 feet). Thus, nitrogen could be used in a cabin atmosphere without a significant change in structural requirements of the closed system over that required for pure oxygen. For altitudes above 400 miles, or for long missions, the shielding and structural requirements may be such that the use of atmospheric pressure (14.7 p.s.i.) will have little effect on the weight of a properly designed space craft cabin. In this situation the four gas system would be required since pure oxygen could not be employed above approximately 425 mm. Hg. pressure (0.56 atmosphere, 8.2 p.s.i.).

Another factor in the selection of a proper atmosphere involves physiological considerations. There is evidence that nitrogen has a significant physiological role in animal respiration. Specifically its presence in the atmosphere may prevent collapse of the alveoli and may also aid in transporting carbon dioxide from the lungs. It has further been found that the presence of nitrogen increases the breath-holding time relative to that for pure oxygen. Although helium could be used as a substitute for nitrogen, its leakage rate is greater and voice communications are impaired thereby. Because the exact physiological effects produced by breathing pure oxygen for prolonged periods of time are not definitely known, the use of a four gas system has found increasing favor, at least for prolonged missions.

Another important consideration regarding the selection of a three gas or a four gas system is the fire hazard existing in each. Combustions and explosions are well known to occur much more readily in pure oxygen. The combustion times will vary approximately inversely as the partial pressure of nitrogen with pure oxygen. Considerable attention must be given to maintaining the space craft cabin, or other closed ecological system, well insulated from spark-producing components and sources of high temperature. In addition, care is required in maintaining the cabin area relatively free from dust, oil, grease solvents and the like since under weightlessness such contaminants may easily be introduced into regions of the cabin where the potential fire hazard is greater. Rigid restrictions are obviously imposed on the construction materials, insulation and other materials for hermetically sealing the cabin. The possibility of penetration of the cabin by metorites presents a further hazard from combustion which is greater in the presence of pure oxygen. It will be noted that although fire hazards may be substantially reduced by proper construction engineering practices, further improvements will reside in the type of atmosphere selected.

Rapid decompression of the atmosphere in the cabin because of structural failure or puncture by metorites may also result in physiological complications. Where a four gas system is used the problem of "bends" would likely arise. This problem could probably be at least partially solved by substituting helium for nitrogen in the gaseous system. For a three gas system, with oxygen as the principal gas, the problem of bends is not serious, although other complicating physiological effects may arise, such as damage to the lungs, intestines and other parts of the body if decompression occurs at a rapid rate.

The decrease in oxygen partial pressure during decompression presents a hazard in both three and four gas systems. Calculations indicate that the lower limit of oxygen concentration (100 mm. Hg pressure) is approached at a more rapid rate during decompression in a four gas system (14.7 p.s.i.) than in a three gas system (5 p.s.i.), but if the occupants of the space craft or other closed ecological system are equipped with pressure suits that can withstand a pressure differential of 8 p.s.i., a four gas system at reduced pressure (0.46 atm., 20,000 feet) is both feasible and desirable.

Still another factor in the choice of the most advantageous gas system is that of leakage and atmosphere control. Regardless of the precautions taken, some leakage of gas will occur as a result of diffusion through the walls and seals of the closed chamber. This requires, in a three gas system, an extra supply of oxygen to maintain proper pressure. The required oxygen may be regenerated from exhaled carbon dioxide and water vapor. If a four gas system is used, a gradual loss of nitrogen will change the composition of the atmosphere which will necessitate replenishing of the lost nitrogen and means for monitoring its concentration. In this respect, the apparatus necessary to maintain the four gas system would be substantially of the same order of complexity as that required for the three gas system.

An evaluation of the aforementioned consideration reveals that while the three gas system at 5 p.s.i. may have certain slight advantages over a four gas system at 14.7 p.s.i. in such factors as control of composition, effects of decompression and structural requirements of cabins and pressure suits, the relative freedom of the four gas system from fire and explosion hazards, and the physiological advantages deriving from its use, appear to make its use more desirable, particularly for longer missions. Moreover, the slight advantage in structural requirement deriving from employment of the three gas system may be virtually eliminated by the use of a four gas system at pressures lower than atmospheric pressure.

I have found that nitrous oxide may be advantageously employed as a source of both nitrogen and oxygen for a four gas system. Nitrous oxide is commercially available as a liquid under gas pressures of 750–800 p.s.i. Because the density of the liquid at its boiling point ($-88.5°$ C.) is relatively high (1.23 grams/cc.) a large quantity may be carried in limited space at moderate pressures. The pressure at its critical point (36.5° C.) is only 1039 p.s.i.g. when its density is 0.45 gram per cc. This makes it possible to use relatively light weight containers and to transfer the nitrous oxide under zero gravity conditions as a gas if this should be desirable. In its gaseous form nitrous oxide is colorless with slight pleasant odor and sweet taste. It has sometimes been used in high concentrations as a mild anesthetic in dentistry and in somewhat lesser concentrations induces a mild intoxication producing a desire to laugh, thus having been referred to as "laughing gas." It is, however, non-iritating and in small quantities is neither toxic nor dangerous. For example, nitrous oxide is widely used commercially as the propellant gas in a variety of aerosol preparations for whipped cream, shaving cream, and the like.

Nitrous oxide is thermodynamically unstable with respect to nitrogen and oxygen and the heat evolved on decomposition at 25° C. is 19.55 kilo-calories per mole of decomposed material. At 25° C. and one atmosphere of pressure the equilibrium constant for the reaction is $5 \times 10^{-19}$. Hence, at equilibrium very little nitrous oxide is present and a sufficiently active catalyst will decompose the $N_2O$ almost completely into nitrogen and oxygen. I have found that copper-magnesia and nickel magnesia catalysts are well suited for such purpose. The heat evolved in the decomposition process will supply part of that required to maintain the reaction temperature in the required range for catalytic action, and with appropriate insulation and heat exchange the heat requirement for maintaining the reaction will be small once the reaction is started.

The following is illustrative of the preparation of suitable catalyst, and of the structure and operation of the nitrogen-oxygen gas-producing system:

*Example*

In the preparation of a copper-magnesia catalyst, magnesium acetate (0.2 mole) and copper nitrate (0.1 mole) were dissolved in two liters of water and the resulting solution was heated to approximately 70° C. Sodium carbonate (0.3 mole) was added to the solution and the precipitate was filtered and washed. Asbestos fiber (30 grams) was added to a slurry of the precipitate and the resulting mixture was then dried at approximately 125° C.

Referring now to the sole figure, a container 10 of nitrous oxide was coupled via a suitable flow line 14 to a tube 17 containing the catalyst. The tube was surrounded by heat exchanger 20 to maintain the reaction temperature constant at a plurality of steps within a fixed temperature range during the series of experiments. A pressure regulator 22 was inserted in the flow line to control the rate of flow of nitrous oxide to the catalyst tube by varying the pressure within the nitrous oxide container 10.

In one series of experiments 62 grams of copper-magnesia catalyst in the form of a mixture supported on asbestos fiber, prepared in the above described manner, was placed in a 16 cm. section of 5.8 cm. diameter combustion tube. With the nitrous oxide flow rate adjusted to 500 cubic centimeters per minute the extent of decomposition was approximately 16 percent at 380° C., 96 percent at 440° C. and 99 percent at 490° C. The results of gas chromatographic analyses using parallel columns of molecular sieve and silica gel with argon as a carrier gas, with record calibrations with nitrogen and oxygen as well as with air, indicated that the nitrous oxide decomposed into approximately 67 percent $N_2$ and 33 percent $O_2$, in accordance with the theoretical reaction equation: $N_2O \rightarrow N_2 + \frac{1}{2} O_2$.

At higher temperatures and the same flow rate (500 cc./min.), the quantity of residual $N_2O$ was determined using a more sensitive gas chromatograph. Recordings were taken for a 1 cc. sample of product gas, i.e. the gas obtained from the decomposition process, at a plurality of temperatures. At 475° C. the 1 cc. sample contained 0.85 percent residual undecomposed $N_2O$; at 520° C., 0.15 percent: and no peak reading for $N_2O$ was obtained at 570° C., indicating less than 0.01 percent or 100 parts per million at that temperature and flow rate.

The temperature was then increased at 650° C., the flow rate of $N_2O$ was increased to 1200 cc. per minute and gas chromatographic records were obtained on a 2 cc. sample of the product gas. The result was a reading of less than 50 parts per million of undecomposed nitrous oxide. At least 800 cc./minute of nitrogen and 400 cc./minute of oxygen were readily produced using the copper-magnesia catalyst. The traces of nitrous oxide remaining in the product gas were removed by passage thereof through an absorbing material such as aluminosilicate and molecular sieve in a portion of the flow line.

The above example indicates that nitrous oxide can readily be employed as a source of nitrogen and oxygen in a four gas ($N_2$, $O_2$, $CO_2$, $H_2O$) system by decomposition in the presence of an appropriate catalyst. Since the product gas comprises approximately 67 percent $N_2$ and 33 percent $O_2$, the necessity of adjusting the flow from separates supplies of oxygen and nitrogen is eliminated. Moreover, the system is advantageous over those types requiring the storage of high pressure gaseous nitrogen since nitrous oxide can be stored in liquid state in a limited area with only moderate pressure requirement. While certain reaction conditions have been described in the above example, it will be understood that these conditions are not to be construed as limitations in the process except as limitations are set forth in the appended claims.

I claim:

1. A process for producing a breathable atmosphere for a closed ecological system, comprising the steps of
providing nitrous oxide under pressure in liquid state,
reducing the pressure of said nitrous oxide to control gaseous flow rate thereof,
passing the gaseous nitrous oxide into contact, at a temperature within the range from 400° C. to 650° C., with a copper-magnesia catalyst for decomposing the gasous nitrous oxide into gaseous nitrogen and gaseous oxygen, said catalyst impregnated in fibrous heat-resistant material for support thereby,
removing traces of undecomposed nitrous oxide from the effluent nitrogen and oxygen gases by passage thereof through an absorbing material consisting of an aluminosilicate molecular sieve, and
supplying said nitrogen and oxygen gases in the approximate ratio of two parts to one to the atmosphere of said closed ecological system.

2. A process for producing a breathable atmosphere for a closed ecological system, comprising the steps of
providing nitrous oxide under pressure in liquid state,
reducing the pressure of said nitrous oxide to control gaseous flow rate thereof,
passing the gaseous nitrous oxide into contact, at a temperature within the range from 400° C. to 650° C., with a nickel-magnesia catalyst for decomposing the gaseous nitrous oxide into gaseous nitrogen and gaseous oxygen, said catalyst impregnated in fibrous heat-resistant material for support thereby,
removing traces of undecomposed nitrous oxide from the effluent nitrogen and oxygen gases by passage thereof through an absorbing material consisting of an aluminosilicate molecular sieve, and
supplying said nitrogen and oxygen gases in the approximate ratio of two parts to one to the atmosphere of said closed ecological system.

3. A process for producing an atmosphere to sustain animal life in a closed ecological system, comprising the steps of
contacting a copper-magnesia catalyst with nitrous oxide at a controlled rate of flow at a temperature in the range from 400° C. to 650° C. to produce an effluent gaseous mixture of oxygen and nitrogen,
removing undecomposed nitrous oxide from said effluent gaseous mixture by passage thereof through an aluminosilicate molcular sieve, and
supplying the effluent gaseous mixture of nitrogen and oxygen to said closed ecological system as atmospheric gas therefor.

4. A process for producing an atmosphere to sustain animal life in a closed ecological system, comprising the steps of
contacting a nickel-magnesia catalyst with nitrous oxide at a controlled rate of flow at a temperature in the range from 400° C. to 650° C. to produce an effluent gaseous mixture of oxygen and nitrogen,
removing undecomposed nitrous oxide from said effluent gaseous mixture by passage thereof through an aluminosilicate molecular sieve, and
supplying the effluent gaseous mixture of nitrogen and oxygen to said closed ecological system as atmospheric gas therefor.

References Cited

UNITED STATES PATENTS

| | | | |
|---|---|---|---|
| 2,005,706 | 6/1935 | Daudt et al. | 23—288.92 |
| 2,524,566 | 10/1950 | Houtman et al. | 252—475 |
| 2,882,243 | 4/1959 | Milton | 252—455 |
| 2,882,244 | 4/1959 | Milton | 252—455 |

OTHER REFERENCES

Dell et al.: "Faraday Society, Transactions," vol. 49, pp. 201–209 (1953), TK1F25.

Schmid et al.: "Die Naturwissenschaften," vol. 37, pp. 42–43 (1950), Q3N7.

Schwab et al.: "Zeit. für Physikalische Chemie," B.9, pp. 265–268, 270–271, 279–287 (1930), QD1Z45.

LEON ZITVER, *Primary Examiner.*

H. T. MARS, *Assistant Examiner.*